United States Patent [19]

Brandon et al.

[11] Patent Number: 5,815,259
[45] Date of Patent: Sep. 29, 1998

[54] QUICK CHANGE HOUSING

[75] Inventors: Mark Austin Brandon, Poughkeepsie; David Lee Gilbert, Newburgh; John Robert Lankard, Jr., Poughkeepsie, all of N.Y.

[73] Assignee: International Business Machines Corporation, Armonk, N.Y.

[21] Appl. No.: 707,575

[22] Filed: Sep. 4, 1996

[51] Int. Cl.$^6$ .............................. G01N 21/01; G01J 4/00

[52] U.S. Cl. .......................................... 356/244; 356/364

[58] Field of Search ..................................... 356/244, 364

[56] References Cited

U.S. PATENT DOCUMENTS

| | | | |
|---|---|---|---|
| 3,604,812 | 9/1971 | Walsen | 356/244 |
| 4,934,817 | 6/1990 | Gassenhuber | 356/244 |
| 5,307,155 | 4/1994 | Ando et al. | 356/244 |
| 5,526,120 | 6/1996 | Jina et al. | 356/244 |

*Primary Examiner*—F. L. Evans
*Assistant Examiner*—Zandra V. Smith
*Attorney, Agent, or Firm*—Steven J. Soucar

[57] ABSTRACT

A quick change holder for an inspection apparatus is maintained within the apparatus when a strip material retained within the holder is changed. The holder includes first and second panels that define a cavity therebetween that receives the strip material.

5 Claims, 3 Drawing Sheets

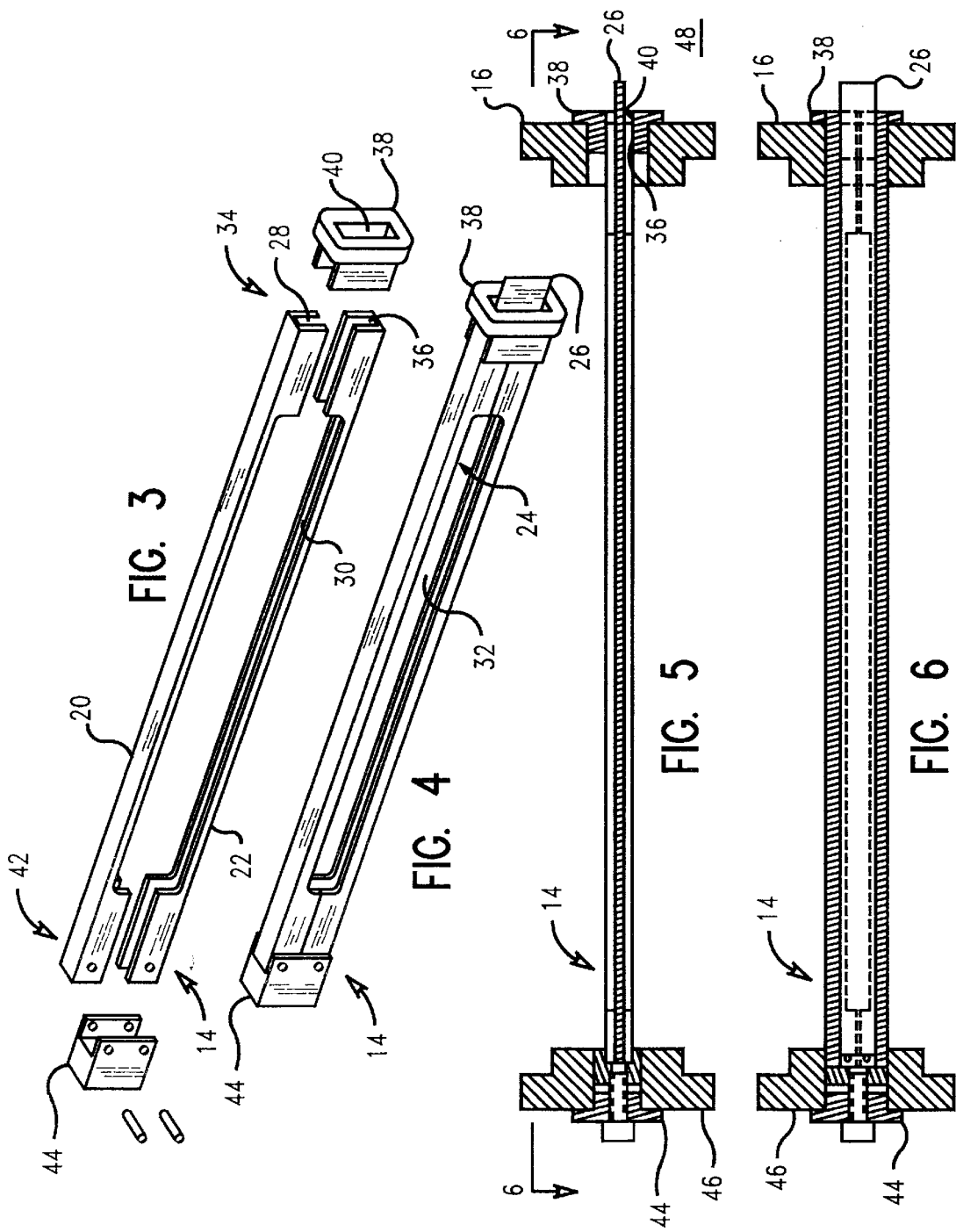

QUICK CHANGE HOUSING

TECHNICAL FIELD

This invention generally relates to a quick change housing for a strip material. More particularly, the invention relates to a quick change housing that permits the ready replacement of the strip material while the holder remains in an inspection apparatus.

BACKGROUND OF THE INVENTION

In the microelectronics industry, the inspection of parts often requires the use of polarized lights. Inspection apparatuses create polarized light by passing nonpolarized light through a strip of polarization material to the inspection area where the part is placed. The strip material is retained in a holder by a solid cap that covers and is bolted to a proximate end of the holder. The holder is within and bolted to the apparatus.

The strip material degrades and must be replaced. To replace the strip material, the holder bolts are removed, the holder is pulled out of the apparatus, the cap bolts are removed, the cap is removed, the old strip material removed, a new strip material is inserted into the holder, the cap is replaced, the cap bolts are replaced, the holder is replaced in the apparatus and the holder bolts are replaced. As if all of these steps were not time consuming enough, the difficulty in replacing the holder in the apparatus exacerbates the problem because a distal end of the holder must be placed in an orifice or on a shoulder deep within the apparatus with no mechanical or visual aid for guidance. Thus, trial and error must be relied upon. The inordinate amount of downtime resulting from replacing the strip material is lost inspection time which slows production. The downtime results in nonproductive time for the apparatus operator and extra work time for the maintenance person who replaces the strip material.

A holder that permits the rapid and easy replacement of a strip material and which does not exhibit at least some of the aforementioned shortcomings of the existing holders is highly desirable.

SUMMARY OF THE INVENTION

The invention provides a quick change holder whose structure permits the rapid and easy replacement of a strip material retained therein. The holder includes first and second side panels having a proximate end. The side panels define a cavity therebetween capable of receiving a strip material therein. The proximate end has an opening in communication with the cavity that is capable of permitting the strip material to pass therethrough.

Numerous other advantages and features of the present invention will become readily apparent from the following detailed description of the preferred embodiments and the appended claims.

BRIEF DESCRIPTION OF THE DRAWINGS

FIG. 3 is an exploded view of the holder.

FIG. 4 is a side perspective view of the holder.

FIG. 5 is a top elevational view of the holder in the apparatus.

FIG. 6 is a side elevational view of the holder in the apparatus taken along line 6—6 of FIG. 5.

DETAILED DESCRIPTION OF THE PREFERRED EMBODIMENTS

Figure 1:
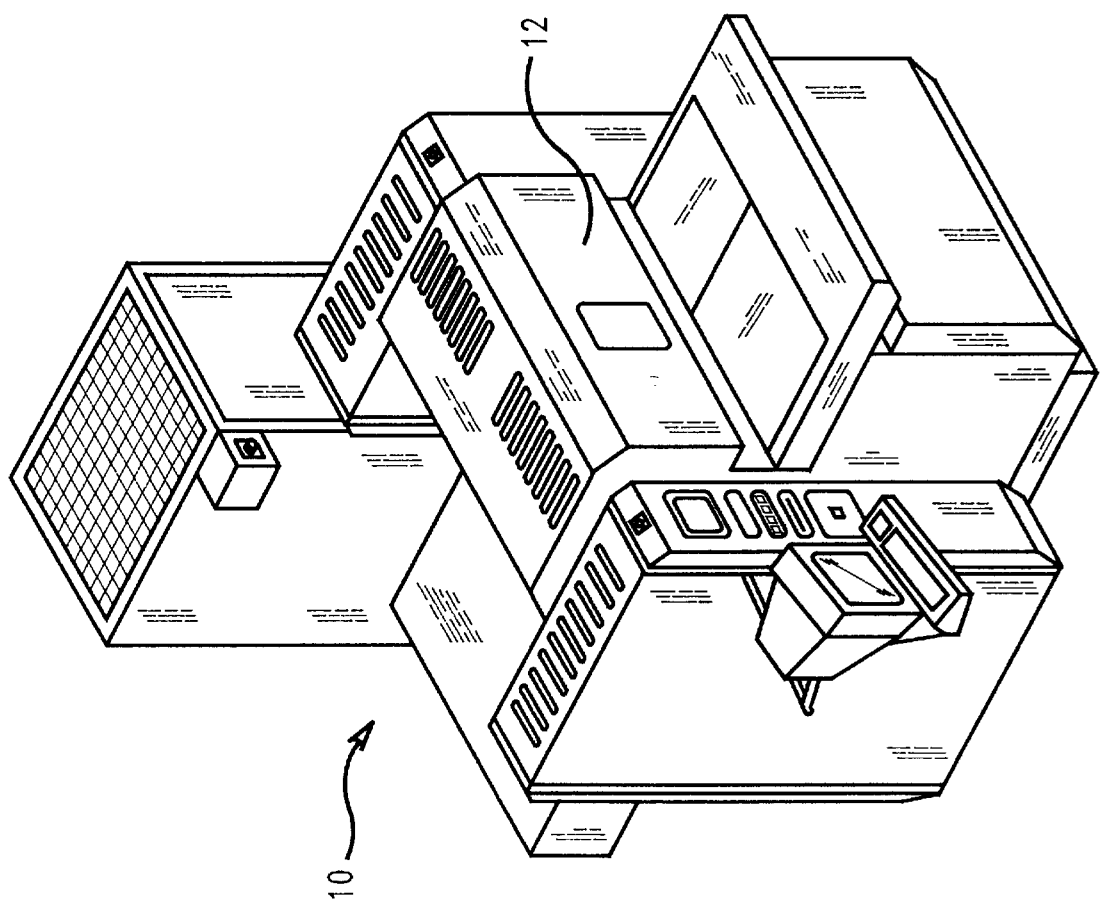
FIG. 1 illustrates a representative inspection apparatus that uses a quick change holder for a strip material.
Figure 2:
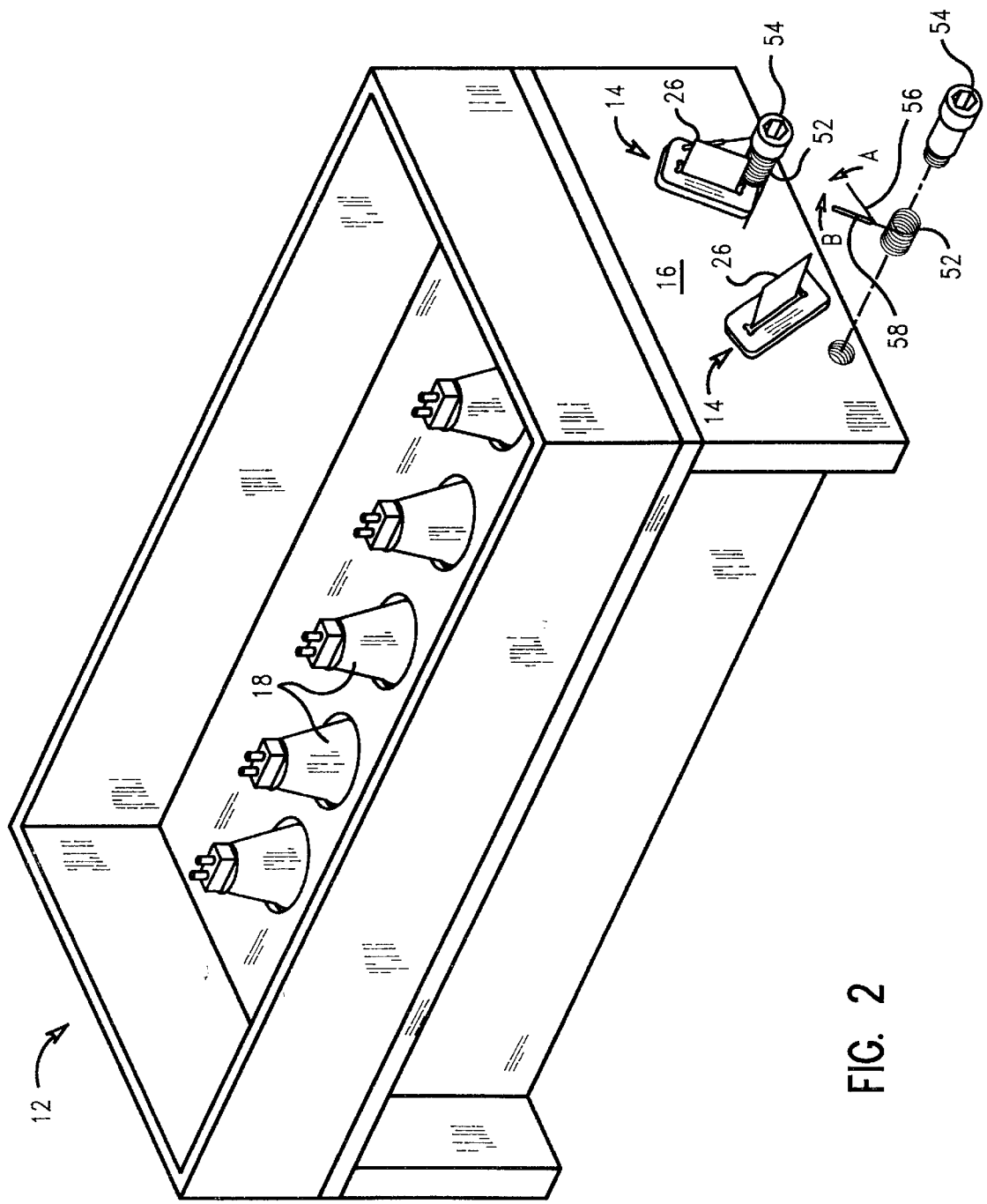
FIG. 2 illustrates an element of the apparatus of FIG. 1 having the holder therein.

Referring to FIGS. 1 and 2, an inspection apparatus 10, e.g., an Orbot Inspection Tool Model Nos. MLC 12 and 1031, commercially available from Orbotech, has a chamber 12 in which quick change housings 14 reside. The holders 14 are secured to a wall 16 of the apparatus 10. Lamps 18 provide the nonpolarized light to be polarized.

Referring to FIGS. 3 and 4, the holder 14 includes first and second panels 20 and 22, respectively, that when assembled define a cavity 24 that is capable of receiving a strip material 26 therein. The panels 20 and 22 have grooves 28 and 30, respectively, that retain the strip material 26. A window 32 defined by the panels 20 and 22 permit light to pass through the strip material 26. In an alternative that is not illustrated, the panels are side panels that are juxtaposed to define the cavity and have cooperating lips that retain the strip material.

A proximate end 34 of the holder 14 has an opening 36 that is in communication with the cavity 24 and which permits the strip material 26 to pass therethrough. A proximate end cap 38 is positioned over the proximate end 32. The proximate end cap 38 has an aperture 40 in communication with the opening 36 which permits the strip material 26 to pass therethrough. A distal end 42 of the holder 14 has a distal end cap 44 secured thereto that inhibits passage of the strip material therethrough.

Referring to FIGS. 5 and 6, the holder 14 is within the apparatus and secured to wall 16 and an opposed apparatus wall 46. The end caps 38 and 40 are on the exterior of the walls 16 and 46, respectively. The opening 36 is in communication with an exterior 48 of the apparatus to permit the strip material 26 to be inserted into the holder 14 while the holder 14 remains in the apparatus. The aperture 40 facilitates this communication. The holder 14 is shorter than the strip material 26 which extends into the exterior 48.

Referring back to FIG. 2, springs 52 for reversibly securing the strip material 26 within the holders 14 are affixed to the wall 16 movably about shoulder screws 54. To secure the strip material 26, biased fingers 56 and 58 of the spring 52 are moved in directions against their respective biases as indicated by arrows A and B, respectively. The strip material 26 is placed between the fingers 56 and 58 and the fingers 56 and 58 are released to engage the strip material 26. The strip material 26 prohibits the fingers 56 and 58 from obtaining their original position with the resulting force securing the strip material 26 in position.

To replace the strip material 26, the fingers 56 and 58 are moved in the directions indicated by arrows A and B, respectively, the strip material 26 is pulled out, new strip material (not shown) is slide into the holder 14 and the fingers 56 and 58 are released.

The present quick change holder permits rapid and easy replacement of a strip material in an apparatus without the downtime and problems faced in the past. This is because the holder remains in the apparatus during the change and avoids having to remove bolts and the holder and replace the bolts and the holder, which is especially troublesome when one cannot see where the holder is to be replaces. The strip material is guided during reinsertion by the holder itself to facilitate replacement.

This invention has been described in connection with the inspection of microelectronic parts using polarized light for which it is particularly well suited. In such an application the strip material is a film that polarizes the light. One skilled in the art would recognize that the invention is not limited thereto and can be used in the inspection of other items and with strip material other than one that polarizes light.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

We claim:

1. A quick change housing for a strip material, the housing comprising first and second panels having a proximate end, the first and second panels being configured to define there between a cavity capable of receiving a strip material therein, the proximate end having an opening in communication with the cavity and being capable of having a strip material pass therethrough, and means for reversibly securing a strip material between the first and second panels and within the holder operably associated therewith, wherein the securing means is adjacent the proximate end.

2. A quick change housing for a strip material, the housing comprising first and second panels having a proximate end, the first and second panels being configured to define there between a cavity capable of receiving a strip material therein, the proximate end having an opening in communication with the cavity and being capable of having a strip material pass therethrough, and means for reversibly securing a strip material between the first and second panels and within the holder operably associated therewith, the securing means is a spring having two biased fingers.

3. A quick change housing for a strip material, the housing comprising first and second panels having a proximate end, the first and second panels being configured to define there between a cavity capable of receiving a strip material therein, the proximate end having an opening in communication with the cavity and being capable of having a strip material pass therethrough; wherein the first and second panels permit passage of light there through.

4. The housing of claim 3 wherein the first and second panels are shorter than a strip material.

5. The housing of claim 3 wherein means for reversibly securing a strip material between the first and second panels and within the holder is operably associated therewith.

* * * * *